United States Patent
Fearon et al.

(10) Patent No.: US 12,241,003 B2
(45) Date of Patent: Mar. 4, 2025

(54) ONE-PART ANAEROBICALLY CURABLE COMPOSITIONS

(71) Applicant: Henkel AG & Co. KGaA, Duesseldorf (DE)

(72) Inventors: Stephen Fearon, Swords (IE); Nigel Sweeney, Terenure (IE); Gerry Coughlan, Tallaght (IE); David Condron, Rathfarnham (IE); Brendan Kneafsey, Lucan (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 480 days.

(21) Appl. No.: 17/468,500

(22) Filed: Sep. 7, 2021

(65) Prior Publication Data

US 2021/0403758 A1    Dec. 30, 2021

Related U.S. Application Data

(63) Continuation of application No. PCT/EP2020/056121, filed on Mar. 6, 2020.

(30) Foreign Application Priority Data

Mar. 7, 2019    (GB) ..................... 1903095

(51) Int. Cl.
| | |
|---|---|
| *C09J 4/06* | (2006.01) |
| *C08F 290/14* | (2006.01) |
| *C08G 18/67* | (2006.01) |
| *C08G 18/76* | (2006.01) |
| *C09J 133/14* | (2006.01) |
| *C09J 175/16* | (2006.01) |

(52) U.S. Cl.
CPC ............. *C09J 4/06* (2013.01); *C08F 290/147* (2013.01); *C08G 18/672* (2013.01); *C08G 18/7621* (2013.01); *C09J 133/14* (2013.01); *C09J 175/16* (2013.01); *C08G 2170/00* (2013.01)

(58) Field of Classification Search
CPC . C09J 4/06; C09J 133/14; C09J 175/16; C09J 133/06; C09J 2400/20; C09J 2400/226; C09J 2433/00; C08F 290/147; C08F 290/067; C08F 220/20; C08F 220/06; C08F 222/1063; C08G 18/672; C08G 18/7621; C08G 2170/00; C09D 5/00; B29C 65/00; B29C 65/48; B32B 37/00; B32B 15/08

See application file for complete search history.

(56) References Cited

U.S. PATENT DOCUMENTS

| | | | |
|---|---|---|---|
| 4,309,526 A | 1/1982 | Baccei | |
| 4,380,613 A * | 4/1983 | Nativi | ................... C09J 175/16 |
| | | | 525/440.12 |
| 4,777,191 A * | 10/1988 | Komai | ..................... C08F 2/50 |
| | | | 522/182 |
| 5,605,999 A | 2/1997 | Chu et al. | |
| 6,852,778 B1 | 2/2005 | Kusuyama | |
| 6,958,368 B1 | 10/2005 | Klemarczyk et al. | |
| 7,411,009 B1 | 8/2008 | Messana et al. | |
| 2006/0018972 A1 | 1/2006 | Hollenbeck | |
| 2008/0242764 A1* | 10/2008 | Wallace | .................. B32B 27/30 |
| | | | 156/332 |
| 2010/0179078 A1 | 7/2010 | Patel et al. | |
| 2014/0275413 A1* | 9/2014 | Dershem | ................ C09J 135/02 |
| | | | 524/706 |

FOREIGN PATENT DOCUMENTS

| | | | |
|---|---|---|---|
| CN | 102037026 B | | 3/2014 |
| CN | 103897099 B | | 8/2016 |
| CN | 106398631 A | * | 2/2017 |
| CN | 106700987 A | | 5/2017 |
| CN | 106893501 A | * | 6/2017 |
| CN | 107841279 | | 3/2018 |
| WO | 2008021014 A1 | | 2/2008 |

OTHER PUBLICATIONS

CN106398631A Machine Translation of Description (EPO/Google) (Year: 2024).*
CN106398631A Machine Translation of Table 4 (Google Translate) (Year: 2024).*
CN106893501A Machine Translation of Description (EPO/Google) (Year: 2024).*
CN106398631A Machine Translation of Table 1 (Google Patents) (Year: 2024).*

* cited by examiner

*Primary Examiner* — Cynthia L Schaller
(74) *Attorney, Agent, or Firm* — Steven C. Bauman

(57) ABSTRACT

Disclosed herein are anaerobically curable compositions comprising one or more polymerizable (meth)acrylate ester monomers, a redox-active metal catalyst, saccharin or a saccharin derivative, a peroxide, and a benzoyl functionalized compound, wherein the composition does not gel after about 24 hours of storage at room temperature and methods of adhering two substrates using the anaerobically curable compositions.

18 Claims, No Drawings

ONE-PART ANAEROBICALLY CURABLE COMPOSITIONS

BACKGROUND OF THE INVENTION

Anaerobically curable compositions are well known. Anaerobically curable compositions remain uncured when exposed to air (oxygen) and cure under suitable anaerobic conditions. The uses of anaerobically curable compositions are broad and continue to be developed. For example, anaerobically curable compositions can be useful as threadlockers, for gasketing, for adhesion to oily substrates, as pipe sealants, and for joint repair.

It is generally known that anaerobically curable compositions can be unstable and lose adhesion performance over time. Accordingly, it is common to employ stabilizers in the composition to obtain anaerobically curable compositions with increased stability. These stabilizers, however, can reduce the performance of the anaerobically curable compositions. Accordingly, two-part anaerobically curable compositions have been used to improve the stability of the composition without the use of stabilizers by separating the reactive components into separate parts. These two-part compositions, however, are not easy to handle or use because they add an additional application step.

Further, for some applications, bonding with an anaerobically curable composition is troublesome. For example, some substrates are difficult to bond with anaerobically curable compositions. While anaerobically curable compositions display good performance on metal substrates, such compositions do not display as impressive performance on glass or plastic substrates. Thus, there is a specific need to tailor anaerobically curable compositions to perform well on such substrates.

It is possible to use a primer for substrates that are difficult to bond such as plastic and glass when utilizing these anaerobically curable compositions. Where two substrates are to be bonded together, primer may be applied to at least one of the substrates. For example, plastic adhesion with one-component anaerobically curable adhesives requires the use of solvent-based activators typically containing metal catalysts and optionally amine accelerators. The process is undesirable for end users as it adds an extra application step and requires the solvent to dry.

Accordingly, there remains a need for a stable one-part anaerobically curable composition that does not require primer to be applied when bonding plastic and metal substrates.

BRIEF SUMMARY OF THE INVENTION

Disclosed herein are anaerobically curable compositions comprising (i) one or more polymerizable (meth)acrylate ester monomers, (ii) a redox-active metal catalyst, (iii) saccharin or a saccharin derivative, (iv) a peroxide, and (v) a benzoyl functionalized compound, wherein the composition does not gel after about 24 hours of storage at room temperature. The components (i) to (v) of the invention are distinct components. For example, the redox-active metal catalyst is not a benzoyl functionalized compound. For example, the benzoyl functionalized compound is not a peroxide.

Further, disclosed herein are methods of adhering two substrates comprising obtaining two substrates; applying an anaerobically curable composition to one or both substrates; combining the two substrates, thermally curing the anaerobically curable composition at less than about 85° C. such as less than about 80° C. for about 20 min, wherein one substrate is a plastic substrate, wherein the surface of the substrates are not activated or otherwise primed.

Further, disclosed herein are methods of adhering two substrates comprising obtaining two substrates, applying an anaerobically curable composition to one or both substrates, combining the two substrates, thermally curing the anaerobically curable composition at less than about 80° C. for about 20 min. The anaerobically curable composition comprises one or more polymerizable (meth)acrylate ester monomers, a redox-active metal catalyst, saccharin or a saccharin derivative, a peroxide, and a benzoyl functionalized compound. One substrate is a plastic substrate and the surface of the substrates are not activated or otherwise primed.

DETAILED DESCRIPTION OF THE INVENTION

Disclosed herein are one part anaerobically curable compositions comprising: one or more polymerizable (meth)acrylate ester monomers, a redox-active metal catalyst, saccharin or a saccharin derivative, peroxide, and a benzoyl functionalized compound. It was surprisingly found that the one-part anaerobically curable compositions disclosed herein do not gel after 24 hours of storage at room temperature. The inclusion of the metal catalyst, saccharin or a saccharin derivative, peroxide and a benzoyl functionalized compound in the described compositions yields stable adhesives that give excellent plastic to metal adhesion following a mild thermal cure. In addition, the anaerobically curable compositions of this invention overcome the need for solvent activators that are generally used on inactive surfaces such as plastic and glass.

Polymerizable (Meth)Acrylate Ester Monomers (Meth)acrylate monomers suitable for use in the anaerobically curable compositions described herein may be chosen from a wide variety of materials, such as those represented by $H_2C=CGCO_2R^4$, where G is hydrogen, halogen or alkyl groups having from 1 to about 4 carbon atoms, and $R^4$ is selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

One class of monomers suited for use in this invention comprises acrylate esters having the following general formula:

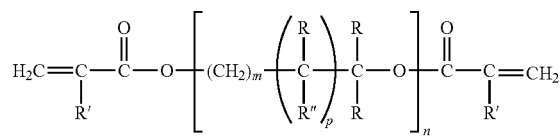

wherein R represents a radical selected from the group consisting of hydrogen, lower alkyl of 1-4 carbon atoms, inclusive, hydroxy alkyl of 1-4 carbon atoms inclusive, and

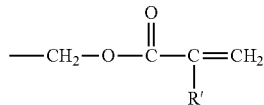

R' is a radical selected from the group consisting of hydrogen, halogen, and lower alkyl of 1-4 carbon atoms; R" is a radical selected from the group consisting of hydrogen, —OH and

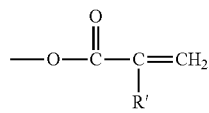

m is an integer equal to at least 1, e.g., from 1 to 8 or higher, for instance, from 1 to 4 inclusive; n is an integer equal to at least 1, for example, 1 to 20 or more; and p is one of the following: 0,1.

The polymerizable (meth)acrylate ester monomers utilized in accordance with the invention and corresponding to the above general formula are exemplified by, but not restricted to, the following materials: diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycerol diacrylate, diglycerol tetramethacrylate, tetramethylene dimethacrylate, ethylene dimethacrylate, neopentyl glycol diacrylate and trimethylol propane triacrylate. Of these, the preferred monomers are triethylene glycol dimethacrylate and polyethylene glycol dimethacrylate.

Typical examples of polyacrylate esters corresponding to the above general formula are di-, tri- and tetraethyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, have been found particularly desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive.

Suitably, the polar group is selected from the group consisting of labile hydrogen, heterocyclic ring, hydroxy, amino, cyano, and halo polar groups. Typical examples of compounds within this category are cyclohexylmethacrylate, tetrahydrofurfuryl methacrylate, hydroxyethyl methacrylate, hydroxypropyl methacrylate, t-butylaminoethyl methacrylate, cyanoethylacrylate, and chloroethyl methacrylate.

Another preferred class of monomers is prepared by the reaction of a monofunctionally substituted alkyl or aryl acrylate ester containing an active hydrogen atom on the functional substituent. This monofunctional, acrylate-terminated material is reacted with an organic polyisocyanate in suitable proportions so as to convert all of the isocyanate groups to urethane or ureide groups.

Additional (meth)acrylate monomers suitable for use herein include polyfunctional (meth)acrylate monomers, such as, but not limited to, di- or tri-functional (meth) acrylates like polyethylene glycol di(meth)acrylates, tetrahydrofuran (meth)acrylates and di(meth)acrylates, hydroxypropyl (meth)acrylate ("HPMA"), hexanediol di(meth) acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate. Examples of ethoxylated bisphenol-A mono and di(meth)acrylates include those within the structure shown below, containing repeating ethoxy units, where m and n are each an integer equal to or greater than 1, for example m and n may be each selected independently from the range of integer values from 1 to 5.

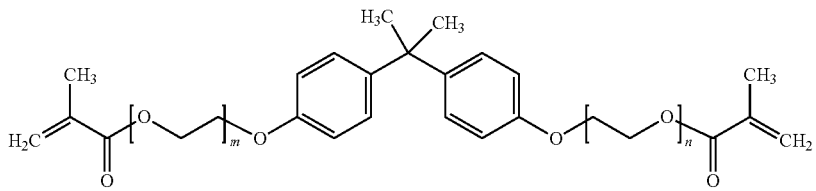

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

The polymerizable (meth)acrylate ester monomers may be present in the composition in an amount from about 10 to about 90 weight percent, suitably about 30 to about 70 weight percent, based on the total weight of the composition.

Redox-Active Metal Catalyst

Cure of the anaerobically curable composition can be initiated by a redox-active metal catalyst comprising a transition metal when the anaerobically curable composition is contacted with the plastic substrate under anaerobic conditions. The redox-active metal catalyst enhances the strength of cure, speed of cure, and combinations thereof of the compositions described herein.

The transition metal included in the redox-active metal catalyst may be titanium, chromium, manganese, iron, cobalt, nickel, copper, zinc, silver, vanadium, molybdenum, ruthenium, and combinations thereof. Further, the transition metal can be provided in the form of a salt. For example, the transition metal salt may be selected from cobalt (II) naphthenate; copper carbonate; copper (II) acetylacetonate; silver nitrate; vanadium (III) acetylacetonate and combinations thereof. Suitably, the redox-active metal catalyst is iron (II)

naphthenate, copper disodium ethylenediamine tetraacetic acid (EDTA.2Na.Cu(II)), or copper naphthenate, vanadium acetylacetonate, vanadyl acetylacetonate, iron (II) acetate, or a combination thereof.

The redox-active metal catalyst may be included in the composition in an amount from about 0.0001 to about 2, suitably about 0.0002 to about 0.5 weight percent, based on the total weight of the composition.

Saccharin/Saccharin Derivative

Saccharin or saccharin derivatives (or any combination thereof) are further included in the composition. Saccharin and acetyl phenyl hydrazine (APH) have been used as cure accelerator components in anaerobic adhesive cure systems. Saccharin is o-benzoic sulfimide. Saccharin derivatives can also be included in the compositions described herein. For example, the N-chloro derivative N-chloro saccharin ("NCS"), the N-sodium derivative o-benzoic sulfimide sodium salt ("SBS") can also be included. The hydrated form of o-benzoic sulfimide sodium salt is also contemplated for use herein. The saccharin derivatives display good solubility, stability and anaerobic activity in anaerobically curable compositions.

It is also desirable to include in combination various species within the genus of saccharin derivatives within structure I:

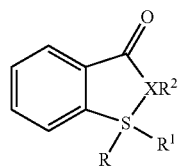

where R and R' may or may not be present, but when at least one is present it is =O; X is N or S; and $R^2$ is halogen or a Group I element, which may be in hydrated form.

Suitably, saccharin and/or any saccharin derivative is present in the compositions described herein in an amount from about 0.1 to 2 weight percent, suitably about 0.25 to 1 weight percent, based on the total weight of the composition.

Peroxide

Peroxides can serve as a free radical generating source which initiate free radical curing of the anaerobically curable compositions described herein. Several well-known initiators of free radical polymerization can be incorporated into the anaerobically curable compositions described herein including, without limitation, peroxides which have a half-life of 10 hours at a temperature between about 80° and 140° C., such as cumene hydroperoxide ("CHP"), para-menthane hydroperoxide, t-butyl hydroperoxide ("TBH") and t-butyl perbenzoate. Other suitable peroxides include benzoyl peroxide, dibenzoyl peroxide, 1,3-bis(t-butylperoxyisopropyl) benzene, diacetyl peroxide, butyl 4,4-bis(t-butylperoxy) valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Further, hydroperoxides which derive from hydrocarbons with a chain length of 3 to 18 carbon atoms can be included in the compositions described herein. For example, cumene hydroperoxide, tert-butyl hydroperoxide, methyl ethyl ketone hydroperoxide, diisopropyl benzene hydroperoxide.

The peroxide may be present in the composition in an amount from about 0.5 to about 10 weight percent, suitably from about 1 to about 5 weight percent, based on the total weight of the composition.

Benzoyl Functionalized Compound

A benzoyl functionalized compound is included in the composition because, as demonstrated in the examples below, the inclusion of a benzoyl functionalized compound surprisingly stabilizes the composition, for example it may stabilize the redox-active metal catalyst. The anaerobically curable compositions disclosed herein are cured anaerobically and not via UV cure. Accordingly, the benzoyl functionalized compound included in the compositions described herein is not used to initiate photocuring.

The benzoyl functionalized compound can be a photoinitiator. For example, those photoinitiators available commercially from BASF Chemical, Germany, under the "IRGACURE" and "DAROCUR" tradenames are desirable, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl phosphine oxide and 2-hydroxy-2-methyl-1-phenyl-propan-1-one) and "DAROCUR" 1173 (2-hydroxy-2-methyl-1-phenyl-1-propane) and 4265 (the combination of 2,4,6-trimethylbenzoyldiphenyl-phosphine oxide and 2-hydroxy 2-methyl-1-phenyl-propan-1-one). Of course, combinations of these materials may also be employed herein. The structures of preferred photoinitiators are shown below.

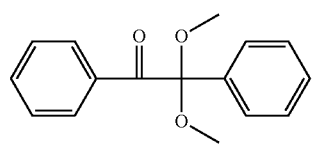

Irgacure 651

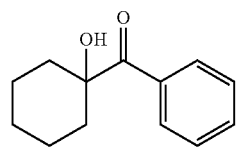

Irgacure 184

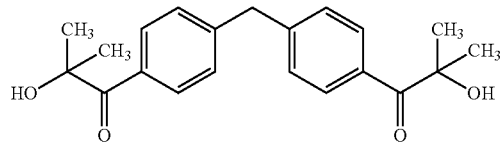

Irgacure 127

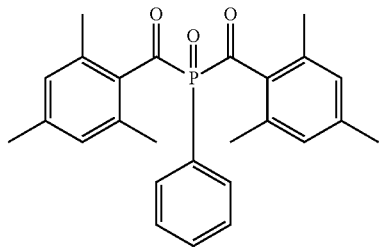

Irgacure 819

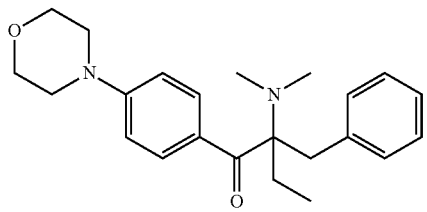

Irgacure 369

The benzoyl functionalized compounds may be included in the composition in an amount from about 0.1 to about 5 weight percent, suitably about 0.5 to about 2 weight percent, based on the total weight of the composition. Desirably the benzoyl functionalized compound is present in an excess amount relative to the redox-active metal catalyst. On a weight basis, based on the total weight of the composition, the benzoyl functionalized compound is desirably present in an excess amount relative to the redox-active metal catalyst. For example the benzoyl functionalized compound is desirably present in an excess amount relative to the redox-active metal catalyst at a ratio of at least about 3:1; for example at least about 4:1 such as at least about 5:1.

Optional Components

Additional components can be included in the anaerobically curable compositions disclosed herein such that these additional components do not interfere with the functionality of the components described above.

For example, acrylic acid can be included in the composition to enhance the cure and adhesion in an amount from about 0 to about 20 weight percent, suitably from about 1 to about 10 weight percent, based on the total weight of the composition.

(Meth)acrylate oligomers can further optionally be included in the composition. (Meth) acrylate oligomers can be included to improve fully cured peel strengths of the compositions described herein. For example, (meth)acrylate capped polyurethane oligomers can be included. A variety of commercial urethane (meth)acrylate oligomer resins are known. Suitably, this component is, or includes, a block resin such as described in U.S. Pat. No. 4,309,526, comprising at least one polyether block derived from a polyether polyol and at least one hard block derived from an aromatic or cycloaliphatic diisocyanate and an aromatic or cycloaliphatic polyol. Especially preferred are such resins in which the polyether polyol is an aliphatic polyether having a number average molecular weight of from about 400 to about 10,000, more suitably about 700 to about 3,500.

If included, (meth)acrylate oligomers can be present in the anaerobically curable composition in an amount from about 5 to about 90 weight percent, suitably from about 10 to about 50 weight percent, based on the total weight of the composition.

Amines can optionally be included in the composition to cause the monomer to polymerize in the absence of oxygen and prevent polymerization of the monomer in the presence of oxygen.

The nature of the amine is not critical for purposes of the anaerobically curable compositions disclosed herein, i.e., primary, secondary, tertiary, aliphatic or aromatic amines can be used. For example, primary aliphatic amines such as ethyl, n-butyl, n-propyl, isopropyl, n-hexyl and t-butyl amines conveniently can be used. Also primary aromatic amines, such as aniline, p-toluidine, or p-naphthylamine, xylidine, benzylamine or p-benzylaniline can be used. Aliphatic or aromatic secondary amines also can be used. Typical examples of acceptable secondary amines are diethylamine, dipropylamine, diisopropylamine, diphenylamine, N-phenyl benzylamine and N-allylaniline.

Tertiary amines are organic amines wherein all three valence of the nitrogen atom are satisfied by carbon atoms. Tertiary amines are also suitable for use in the compositions described herein. The carbon atoms in the tertiary amines may be part of alkyl, carbocyclic or heterocyclic groups, either unsubstituted or hydroxyl-substituted. Generally, the trialkylamines and dialkylanilines are most suitably employed. However, alkaloids and other compounds within the scope of the above definition are also suitable for the present invention. Exemplary of the various tertiary amines that may be utilized are triethylamine, tripropylamine, tributylamine, triamylamine, triphenylamine, dimethylaniline, ethyldiethanolamine, triethanolamine and piperidine.

Generally, amines suitable for use in the compositions described herein can be represented by the formula R"—R—NH, wherein R" is a hydrocarbon radical containing up to about 14 carbon atoms, suitably an aliphatic or aromatic hydrocarbon group containing up to about eight carbon atoms, and R is either hydrogen or R. Naturally, either R" or R can contain any substituent or linkage, hydrocarbon or otherwise, which does not affect the condensation product adversely for the purpose disclosed herein.

The amine or amines used in the compositions described herein are suitably liquid at room temperature for ease in handling and mixing, although gaseous and solid compounds may be employed by dispersing them in the monomer.

A variety of secondary and tertiary organic amines, suitably secondary aromatic amines can be included in the anaerobically curable compositions disclosed herein.

Amines, suitably secondary aromatic amines, can be included in the composition in an amount up to about 5 weight percent, suitably about 0.001 to about 2 weight percent based on the total weight of the composition.

Chelators can further optionally be included in the composition. Chelators, such as ethylenediamine tetraacetic acid (EDTA), can be employed in the anaerobically curable compositions described herein to sequester metal ions. For example, chelators can be included in the composition in an amount from about 0.0001 to about 1 weight percent, suitably from about 0.0002 to about 0.5 weight percent, based on the total weight of the composition.

Free radical stabilizers can further optionally be included in the composition. Phenols such as hydroquinone, benzoquinone, naphthaquinone, anthraquinone, butylated hydroxytoluene and p-methoxyphenol can be used to prevent premature polymerization due to peroxide decomposition and formation of free radicals. For example, free radical stabilizers can be included in the composition in an amount of about 0.0001 to about 2 weight percent, suitably about 0.0002 to about 0.5 weight percent, based on the total weight of the composition.

Silica and inorganic fillers can also optionally be included in the composition. Silicas are can be added to make the composition more viscous, i.e. thixotropic. This is beneficial for non-flow and non-sag properties such as for use in gasket sealing. Suitably, when silica and/or inorganic fillers are included in the composition they are included in an amount of up to about 10 weight percent, suitably up to about 5 weight percent, based on the total weight of the composition.

Additional resins can also optionally be included in the composition. These additional resins can include but are not limited to polyester and polyurethanes. These resins can be included in the composition in an amount of up to about 50 weight percent, suitably up to about 20 weight percent, based on the total weight of the composition.

To prepare the anaerobically curable composition, the components are combined while undergoing vigorous mixing in air. The order of combination is not limited and the components can be added together in any desired order. For example, in the Examples that follow, the components are added to the mixture in the order in which they appear in the table. The anaerobically curable compositions disclosed herein are suitable for use as anaerobically curable adhesives and for other applications of anaerobically curable compositions.

Methods of adhering two substrates using the compositions described herein are also contemplated. The method comprises obtaining two substrates, applying the anaerobically curable compositions described herein to one or both substrates, combining the two substrates, and thermally curing the anaerobically curable composition at less than about 85° C. such as less than about 80° C. for about 20 min. One of the substrates is a plastic or glass substrate and the surface of the substrates are not activated or otherwise primed. The resulting adhesion is high strength which will typically show cohesive failure of the adhesive between the bonded substrates and, if strong enough, will show substrate failure of the plastic substrate.

EXAMPLES

In all of the following Examples, different formulations were made by adding ingredients in the order shown in the tables to make 50-gram (g) batches of each formulation in 100 g containers. The formulations were speed mixed in a Speedmixer DAC 150 FVZ at 2000 rotations per minute (rpm) for 3 minutes.

The following premixes and dispersions were used and are referred to throughout the following Examples:

Premix A: 94.2% Polyethylene glycol dimethacrylate (PEGMA), 1.3% Ethylenediamine, 4.5% 2-pyridine carboxyaldehyde
Premix B: 73.5% Propylene Glycol, 23% Water, 3.5% Naphthaquinone
Premix C: 9.2% Water, 1-Hydroxyethane-1,1-diphosphonic acid, 81.7% Ethylene Glycol
PUMA Resin: 55% Polyol reacted with toluene diisocyanate and end-capped with Hydroxyethyl methacrylate (HEMA), 22% HEMA, 15% Isobornyl methacrylate (IBOMA), 8% Hydroxypropyl methacrylate (HPMA)

Example 1: Improved Stability 50 g of each formulation was stored for 24 hours in a plastic tub with a screw cap lid and empty headspace, i.e. an aerobic environment to test the stability of the formulation when stored in an anaerobic environment.

Table 1 below shows the stability of each of Formulations 1–4 after 24 hours of storage in anaerobic conditions. Formulation 1 contains saccharin, a peroxide, iron(II)naphthenate and an aromatic amine. This formulation has poor stability as shown by the gelling within 24-hour storage. In Formulation 2, the peroxide is removed. Formulation 2 similarly showed gelling and poor stability. Formulation 3 contains saccharin, a peroxide, iron(II)naphthenate and an aromatic amine as well as Irgacure 651. Formulation 3 showed no gelling after 24 hours of storage and improved stability compared to Formulations 1 and 2. Formulation 4 is similar to Formulation 3, except that the peroxide was not added to Formulation 4. Formulation 4 similarly showed no gelling after 24 hours and good stability.

TABLE 1

| Material | Formulation 1 wt. % | 2 wt. % | 3 wt. % | 4 wt. % |
|---|---|---|---|---|
| HEMA | 50.408 | 51.408 | 48.410 | 49.408 |
| Premix A | 0.030 | 0.030 | 0.030 | 0.030 |
| Premix B | 0.050 | 0.050 | 0.050 | 0.050 |
| Premix C | 0.050 | 0.050 | 0.050 | 0.050 |
| PUMA resin | 45.310 | 45.310 | 45.308 | 45.310 |
| Saccharin | 0.500 | 0.500 | 0.500 | 0.500 |
| Tert-butyl peroxy-benzoate (Trigonox C) | 1.000 | 0.000 | 1.000 | 0.000 |
| Acrylic Acid | 2.450 | 2.450 | 2.450 | 2.450 |
| 2,2-Dimethoxy-2-phenyl-acetophenone (Irgacure 651) | 0.000 | 0.000 | 2.000 | 2.000 |
| Iron Naphthenate (80% in Mineral Oil, 12% Fe) | 0.200 | 0.200 | 0.200 | 0.200 |
| Solvent Blue 59 | 0.002 | 0.002 | 0.002 | 0.002 |
| Sum | 100.00 | 100.00 | 100.00 | 100.00 |
| Gelling within 24-hour storage at room temp. | Yes | Yes | No | No |

Example 2: Improved Adhesion Performance

Adhesion tests were done according to ASTM D 1002-05. Lap shears were wiped with isopropanol prior to assembly. The lap shears measured 1"×4" in dimensions and the joined lap shears overlapped at a 0.5" mark and were clamped with Hargrave No. 1 clamps. The bonded lap shears were tested using a Hounsfield Tensile tester Machine with a load cell of 15 kN. The cross-head speed was 6 mm/min.

The substrates tested were stainless steel (SUS 304-2B), nylon (Nylon 6,6), phenolic (a 50% glass filled phenolic resin), PPS (a composite grade Fortran 6165 A6). In the tables below stainless steel is denoted by SS.

Formulation 5 contains acetyl phenyl hydrazine (APH) and saccharin as cure accelerators and a benzoyl functionalized compound, but no metal catalysts. Formulation 6 contains iron(II)naphthenate, but no APH. Formulation 3 was reproduced from Example 1, above. Formulations 6 and 3 in particular show excellent adhesion on the plastic to stainless steel substrate combinations, following a heat cure at 80° C. Formulation 3 shows improved performance following a heat cure at 60° C. compared to Formulation 6 and Formulation 5.

TABLE 2

| Material | Formulation 5 wt. % | 6 wt. % | 3 wt. % |
|---|---|---|---|
| HEMA | 48.110 | 48.410 | 48.410 |
| Premix A | 0.030 | 0.030 | 0.030 |
| Premix B | 0.050 | 0.050 | 0.050 |
| Premix C | 0.050 | 0.050 | 0.050 |
| PUMA resin dispersion | 45.310 | 45.310 | 45.310 |
| Acetyl phenylhydrazine | 0.500 | 0.000 | 0.000 |
| Saccharin | 0.500 | 0.500 | 0.500 |
| Tert-butyl peroxy-benzoate (Trigonox C) | 1.000 | 1.000 | 1.000 |
| Acrylic Acid | 2.450 | 2.450 | 2.450 |
| 2,2-Dimethoxy-2-phenylacetophenone (Irgacure 651) | 2.000 | 2.000 | 2.000 |

TABLE 2-continued

| Material | Formulation 5 wt. % | Formulation 6 wt. % | Formulation 3 wt. % |
|---|---|---|---|
| Iron Naphthenate (80% in Mineral Oil, 12% Fe) | 0.000 | 0.200 | 0.200 |
| Solvent Blue 59 | 0.000 | 0.000 | 0.002 |
| | 100.00 | 100.00 | 100.00 |
| SUBSTRATE (24-hour Room Temp cure) | | | |
| SS/Nylon (MPa) | 4.1 +/− 1.2 | 2.7 +/− 0.8 | 1.9 +/− 0.5 |
| SS/Phenolic (MPa) | 4.6 +/− 0.8 | 0.6 +/− 0.2 | 1.2 +/− 0.3 |
| SS/PPS (MPa) | 0.3 +/− 0.6 | 0 | 0.4 +/− 0.4 |
| SUBSTRATE (65° C./ 20 min cure) | | | |
| SS/Nylon (MPa) | 5.0 +/− 0.9 | 5.4 +/− 1.2 | 4.6 +/− 0.9 |
| SS/Phenolic (MPa) | 7.4 +/− 1.5 | 5.6 +/− 2.2 | 8.3 +/− 1.6 |
| SS/PPS (MPa) | 5.5 +/− 1.6 | 4.7 +/− 2.5 | 7.7 +/− 2.5 |
| SUBSTRATE (80° C./ 20 min cure) | | | |
| SS/Nylon (MPa) | 3.8 +/− 0.4 | 3.4 +/− 1.4 | 5.6 +/− 1.3 |
| SS/Phenolic (MPa) | 7.1 +/− 1.9 | 8.9 +/− 0.3 | 9.1 +/− 0.5* |
| SS/PPS (MPa) | 4.9 +/− 1.2 | 9.5 +/− 2.8 | 8.1 +/− 1.5 |

*Denotes an occurrence of plastic substrate failure.

Example 3: Improved Performance

Formulation 7 is a comparative formulation that contains peroxide, saccharin and EDTA.2Na.Cu(II). As shown in Table 3, Formulation 7 demonstrates poor bonding performance but shows good initial stability. However, in Formulation 8 when the photoinitiator Irgacure 651 is added, performance on stainless steel bonded to plastics is improved. Formulation 8 shows increased initial stability from the inclusion of the photoinitiator.

TABLE 3

| Material | Formulation 7 wt. % | Formulation 8 wt. % |
|---|---|---|
| HEMA | 49.910 | 48.410 |
| Premix A | 0.030 | 0.030 |
| Premix B | 0.050 | 0.050 |
| Premix C | 0.050 | 0.050 |
| PUMA resin dispersion | 45.308 | 45.308 |
| Acetyl phenylhydrazine | 0.500 | 0.000 |
| Saccharin | 0.500 | 0.500 |
| Tert-butyl peroxy-benzoate (Trigonox C) | 1.000 | 1.000 |
| Acrylic Acid | 2.450 | 2.450 |
| 2,2-Dimethoxy-2-phenyl-acetophenone (Irgacure 651) | 0.000 | 2.000 |
| EDTA•2Na•Cu(II) | 0.200 | 0.200 |
| Solvent Blue 59 | 0.002 | 0.002 |
| | 100.000 | 100.000 |
| SUBSTRATE (60° C./ 20 min cure) | | |
| SS/Nylon (MPa) | 1.6 +/− 1.5 | 2.6 +/− 0.1 |
| SS/Phenolic (MPa) | 4.8 +/− 1.7 | 2.4 +/− 1.1 |
| SS/PPS (MPa) | 0.6 +/− 0.3 | 1.1 +/− 1.0 |
| SUBSTRATE (80° C./ 20 min cure) | | |
| SS/Nylon (MPa) | 0.9 +/− 0.9 | 2.4 +/− 1.0 |
| SS/Phenolic (MPa) | 5.6 +/− 0.7 | 8.3 +/− 1.1 |
| SS/PPS (MPa) | 0 | 6.2 +/− 0.7 |
| Gelling after 24-hour storage at room temp | No | No |

Example 4: Additional Examples Using Different Benzoyl Functionalized Compounds Formulations 9-13 demonstrate that other photoinitiators have varying levels of improvement on cure performance when used with EDTA.2Na.Cu(II) and stability is retained while using other benzoyl functionalized compounds. In Formulation 11, a co-catalyst, cobalt neodecanoate, is also included and stability is retained.

TABLE 4

| Material | Formulation 9 wt. % | Formulation 10 wt. % | Formulation 11 wt. % | Formulation 12 wt. % | Formulation 13 wt. % |
|---|---|---|---|---|---|
| HEMA | 49.34 | 49.34 | 49.34 | 49.34 | 49.34 |
| Premix A | 0.03 | 0.03 | 0.03 | 0.03 | 0.03 |
| Premix B | 0.05 | 0.05 | 0.05 | 0.05 | 0.05 |
| Premix C | 0.05 | 0.05 | 0.05 | 0.05 | 0.05 |
| PUMA dispersion | 45.32 | 45.32 | 45.32 | 45.32 | 45.32 |
| Saccharin | 0.50 | 0.50 | 0.50 | 0.50 | 0.50 |
| Trigonox C | 1.00 | 1.00 | 1.00 | 1.00 | 1.00 |
| Acrylic Acid | 2.50 | 2.50 | 2.50 | 2.50 | 2.50 |
| EDTA•2Na•Cu(II) | 0.20 | 0.20 | 0.20 | 0.20 | 0.20 |
| Cobalt neodecanoate (10% Co(II)) | 0.00 | 0.00 | 0.20 | 0.00 | 0.00 |
| Irgacure 127 | 1.00 | 0.00 | 0.00 | 0.00 | 0.00 |
| Irgacure 369 | 0.00 | 1.00 | 0.00 | 0.00 | 0.00 |
| Irgacure 651 | 0.00 | 0.00 | 1.00 | 0.00 | 0.00 |
| Irgacure 819 | 0.00 | 0.00 | 0.00 | 1.00 | 0.00 |
| Irgacure 184 | 0.00 | 0.00 | 0.00 | 0.00 | 1.00 |
| Solvent Blue 59 | 0.01 | 0.01 | 0.01 | 0.01 | 0.01 |
| | 100.00 | 100.00 | 100.20 | 100.00 | 100.00 |

TABLE 4-continued

| | Formulation | | | | |
|---|---|---|---|---|---|
| Material | 9 wt. % | 10 wt. % | 11 wt. % | 12 wt. % | 13 wt. % |
| SUBSTRATE (65° C./ 20 min cure) | | | | | |
| SS/Nylon (MPa) | 2.4 +/- 0.6 | 1.5 +/- 1.3 | 0.9 +/- 0.9 | 2.5 +/- 1.1 | 3.6 +/- 0.0 |
| SS/Phenolic (MPa) | 5.5 +/- 0.3 | 5.4 +/- 0.9 | 2.5 +/- 0.6 | 5.2 +/- 0.3 | 5.7 +/- 0.2 |
| SS/PPS (MPa) | 1.5 +/- 1.0 | 2.4 +/- 1.8 | 0.0 | 4.8 +/- 2.9 | 4.4 +/- 1.8 |
| SUBSTRATE (80° C./ 20 min cure) | | | | | |
| SS/Nylon (MPa) | 2.4 +/- 0.9 | 2.6 +/- 1.0 | 2.2 +/- 0.6 | 3.2 +/- 0.8 | 4.2 +/- 0.7 |
| SS/Phenolic (MPa) | 8.1 +/- 0.7 | 6.0 +/- 0.6 | 7.5 +/- 1.4 | 8.5 +/- 0.5 | 8.2 +/- 1.0 |
| SS/PPS (MPa) | 7.6 +/- 1.2 | 1.0 +/- 0.7 | 6.8 +/- 1.6 | 8.7 +/- 1.2 | 8.7 +/- 1.7 |
| Gelling after 24-hour storage at room temp | No | No | No | No | No |

Example 5: Retention of Performance of Samples Stored at Room Temperature for One Month The formulations were stored for 25 days at room temperatures in the plastic tubs described in Example 1 before retesting according to the procedure set forth in Example 2, above.

The results set forth in Table 5 demonstrate that the inclusion of the benzoyl functionalized compounds not only increases stability after 24 hours, but also retains performance of the composition after storage at room temperature for one month.

TABLE 5

| | Formulation | | |
|---|---|---|---|
| Material | 3 wt. % | 14 wt. % | 15 wt. % |
| HEMA | 49.348 | 49.340 | 49.340 |
| Premix A | 0.030 | 0.030 | 0.030 |
| Premix B | 0.050 | 0.050 | 0.050 |
| Premix C | 0.050 | 0.050 | 0.050 |
| PUMA dispersion | 45.320 | 45.320 | 45.320 |
| Saccharin | 0.500 | 0.500 | 0.500 |
| Trigonox C | 1.000 | 1.000 | 1.000 |
| Acrylic Acid | 2.500 | 2.500 | 2.500 |
| Iron Naphthenate (80% in Mineral Oil, 12% Fe) | 0.200 | 0.200 | 0.200 |
| Irgacure 651 | 1.000 | 0.000 | 0.000 |
| Irgacure 819 | 0.000 | 1.000 | 0.000 |
| Irgacure 184 | 0.000 | 0.000 | 1.000 |
| Solvent Blue 59 | 0.002 | 0.010 | 0.010 |
| | 100 | 100 | 100 |
| SUBSTRATE (80° C./ 20 min cure) Initial | | | |
| SS/Nylon (MPa) | 5.6 +/- 1.3 | 3.3 +/- 1.0 | 4.6 +/- 0.4 |
| SS/Phenolic (MPa) | 9.1 +/- 0.5* | 8.7 +/- 0.5* | 8.4 +/- 0.4 |
| SS/PPS (MPa) | 8.1 +/- 1.5 | 3.6 +/- 0.8 | 4.6 +/- 1.3 |
| SUBSTRATE (80° C./ 20 min cure) after 25 days | | | |
| SS/Nylon (MPa) | 3.4 +/- 1.1 | 4.8 +/- 0.5 | 4.2 +/- 0.9 |
| SS/Phenolic (MPa) | 8.6 +/- 0.8 | 7.2 +/- 1.3* | 7.7 +/- 0.9 |
| SS/PPS (MPa) | 7.7 +/- 1.9 | 5.7 +/- 0.6 | 3.1 +/- 1.3 |

*Denotes an occurrence of plastic substrate failure.

Example 6: Retention of Performance when Stored at 35° C.

Formulations 5, 6 and 8, shown above, were stored in 500 ml LDPE bottles which are impermeable to UV light. The bottles were filled half way and then stored in a chamber at 35° C.

As described above, Formulation 5 is a light curable-anaerobic formulation, containing acetyl phenyl hydrazine (APH) and saccharin as cure accelerators and a benzoyl functionalized compound, but no metal catalysts.

TABLE 6

| Formulation 5 (80° C./20 min cure) | | | | | | |
|---|---|---|---|---|---|---|
| Days at 35° C. | 0 | 21 | 47 | 60 | 77 | 87 |
| SS/Nylon (MPa) | 3.8 +/- 0.4 | 3.5 +/- 0.9 | 1.9 +/- 0.1 | 3.5 +/- 0.2 | 2.8 +/- 1.0 | 3.6 +/0.4 |
| SS/Phenolic (MPa) | 7.1 +/- 1.9 | 8.3 +/- 0.4 | 7.0 +/- 0.7 | 7.5 +/- 0.5 | 7.0 +/- 1.7 | 6.9 +/- 1.2 |
| SS/PPS (MPa) | 4.9 +/- 1.2 | 5.3 +/- 1.7 | 6.6 +/- 2.7 | 7.3 +/- 2.8 | 4.7 +/- 0.3 | 4.7 +/- 0.7 |

As described above, Formulation 6 contains saccharin, a peroxide, iron(II) naphthenate and an aromatic amine as well as Irgacure 651. Table 7 shows Formulation 6 is stable up to 60 days, with retention of performance up to at least 47 days.

TABLE 7

Formulation 6 (80° C./20 min cure)

| Days at 35° C. | 0 | 21 | 47 | 60 | 77 | 87 |
|---|---|---|---|---|---|---|
| SS/Nylon (MPa) | 3.4 +/− 1.4 | 4.6 +/− 0.2 | 4.6 +/− 0.6 | 3.6 +/− 0.7 | Formulation gelled | |
| SS/Phenolic (MPa) | 8.9 +/− 0.3 | 9.4 +/− 0.8* | 8.8 +/− 0.7* | 5.7 +/− 1.8 | | |
| SS/PPS (MPa) | 9.5 +/− 2.8 | 7.5 +/− 3.4 | 6.1 +/− 1.0 | 7.7 +/− 0.9 | | |

*Denotes an occurrence of plastic substrate failure.

As described above, Formulation 8 contains saccharin, a peroxide, disodium EDTA copper(II) salt and an aromatic amine as well as Irgacure 651. Table 8 shows that performance of Formulation 8 is retained for up to 87 days at 35° C.

TABLE 8

Formulation 8 (80° C./20 min cure)

| Days at 35° C. | 0 | 21 | 47 | 60 | 77 | 87 |
|---|---|---|---|---|---|---|
| SS/Nylon (MPa) | 2.4 +/− 1.0 | 5.6 +/− 1.9 | 5.3 +/− 1.1 | 4.5 +/− 1.0 | 4.9 +/− 1.9 | 4.2 +/− 0.6 |
| SS/Phenolic (MPa) | 8.3 +/− 1.1 | 8.7 +/− 0.8 | 7.8 +/− 0.7 | 8.1 +/− 0.7* | 6.3 +/− 0.9 | 8.7 +/− 0.9 |
| SS/PPS (MPa) | 6.2 +/− 0.7 | 6.7 +/− 3.0 | 4.0 +/− 2.0 | 5.5 +/− 2.9 | 6.1 +/− 1.6 | 6.4 +/− 1.8 |

*Denotes an occurrence of plastic substrate failure.

Example 7: Results for Testing on Black Oxide Bolts (BO) and Mild Steel Nuts (MS)

Additional tests were performed on BO bolts and MS nuts for threadlocking applications. The break torque performance and prevail strengths were measured in accordance with ASTM D5649 "Torque Strength of Adhesives Used on Threaded Fasteners". Nuts and bolts were degreased prior to assembly with the formulations. The break strength is the initial torque required to break the bond when measured at the first movement between the nut and the bolt when unscrewing the assembly.

A base formulation was made which is known to give high threadlocking strengths and various cure system were tested.

Formulation 16 contains acetyl phenyl hydrazine as a cure accelerator (typical cure system). Formulation 17 contains an active metal catalyst (iron naphthenate) with no benzoyl functionalized compound. Formulation 18 contains copper EDTA salt with no benzoyl functionalized compound. Formulations 19 and 20 are the same as Formulations 17 and 18, with an added benzoyl functionalized compound.

TABLE 9

| | Formulation | | | | |
|---|---|---|---|---|---|
| | 16 wt. % | 17 wt. % | 18 wt. % | 19 wt. % | 20 wt. % |
| PEGMA | 47 | 47 | 47 | 47 | 47 |
| HEMA | 48 | 48.3 | 48 | 46.3 | 46 |
| Acetyl phenylhydrazine | 0.5 | — | — | — | — |
| Iron Naphthenate (80% in Mineral Oil, 12% Fe) | — | 0.2 | — | 0.2 | — |
| EDTA•2Na•Cu(II), | — | — | 0.5 | — | 0.5 |
| Saccharin | 1 | 1 | 1 | 1 | 1 |
| Premix B | 0.5 | 0.5 | 0.5 | 0.5 | 0.5 |
| Premix C | 1 | 1 | 1 | 1 | 1 |
| Irgacure 651 | — | — | — | 2 | 2 |
| Cumene Hydroperoxide (CHP) | 2 | 2 | 2 | 2 | 2 |
| | 100 | 100 | 100 | 100 | 100 |
| | | | Break/Prevail N · m | | |
| BO/MS 24 hour room temperature cure | 28.7/33.6 | 20.2/18.8 | 15.6/14 | 15/7.5 | 14/8.0 |
| BO/MS 80° C./20 min + 24 hour room temperature cure | Not tested | Not tested | Not tested | 27/16 | 23.5/13 |
| Tests with samples stored for 1 week at room temperature | Not tested | 10.7/2.5 | 17.8/3.2 | 28/19 | 25/15 |

The test results shown in Table 9 demonstrate that when compared to acetylphenyl hydrazine, threadlocking performance is comparable when using heat cure. This is different than the metal to plastic testing shown above in Examples 1-6, where performance was improved.

The invention claimed is:

1. An anaerobically curable composition comprising:
   one or more polymerizable (meth) acrylate ester monomers,
   a redox-active metal catalyst,
   saccharin or a saccharin derivative,
   a peroxide, and
   a benzoyl functionalized compound,
   wherein the benzoyl functionalized compound and the redox-active metal catalyst are present in the composition in a ratio of at least 3:1,
   wherein the composition does not gel after about 24 hours of storage at room temperature.

2. The anaerobically curable composition of claim 1, wherein the composition further comprises one or more oligomeric polymerizable (meth) acrylate monomers.

3. The anaerobically curable composition of claim 1, wherein the composition further comprises an amine.

4. The anaerobically curable composition of claim 3, wherein the amine is a secondary aromatic amine.

5. The anaerobically curable composition of claim 1, wherein the composition further comprises a free radical stabilizer, acrylic acid, silica or inorganic fillers, chelators, or a combination thereof.

6. The anaerobically curable composition of claim 1, wherein the benzoyl functionalized compound is a photoinitiator.

7. The anaerobically curable composition of claim 6, wherein the photoinitiator is selected from the group consisting of: 1-hydroxycyclohexyl phenyl ketone; 2-methyl-1-[4-(methylthio) phenyl]-2-morpholino-propan-1-one; 2-benzyl-2-N, N-dimethylamino-1-(4-morpholinophenyl)-1-butanone; a combination of 1-hydroxy cyclohexyl phenyl ketone and benzophenone; 2,2-dimethoxy-2-phenyl acetophenone; a combination of bis (2,6-dimethoxybenzoyl-2,4, 4-trimethyl pentyl phosphine oxide and 2-hydroxy-2-methyl-1-phenyl-propan-1-one; 2-hydroxy-2-methyl-1-phenyl-1-propane; a combination of 2,4,6-trimethylbenzoyldiphenyl-phosphine oxide and 2-hydroxy 2-methyl-1-phenyl-propan-1-one;

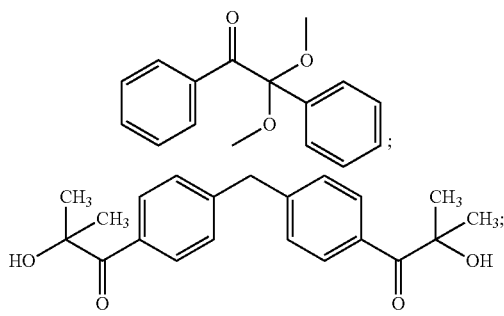

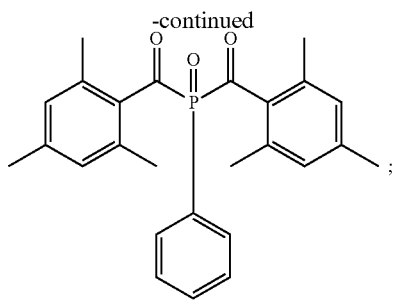

and, any combination thereof.

8. The anaerobically curable composition of claim 1, wherein the composition is capable of cure at less than about 85° C.

9. The anaerobically curable composition of claim 1, wherein the redox-active metal catalyst is iron (II) naphthenate, EDTA.2Na. Cu (II), ff copper naphthenate, vanadium acetylacetonate, vanadyl acetylacetonate, iron (II) acetate, or a combination thereof.

10. The anaerobically curable composition of claim 1, wherein the peroxide is present in an amount from about 0.5 to about 10 wt. % based on the total weight of the composition.

11. The anaerobically curable composition of claim 1, wherein the benzoyl functionalized compound is present in an amount from about 0.1 to about 5 wt. % based on the total weight of the composition.

12. The anaerobically curable composition of claim 1, wherein the redox-active metal catalyst in an amount from about 0.0001 to about 2 wt. % based on the total weight of the composition.

13. A method of adhering two substrates comprising:
    obtaining two substrates, each having surfaces;
    applying an anaerobically curable composition of claim 1 to one or both substrates;
    combining the two substrates;
    thermally curing the anaerobically curable composition at about 60° C. to about 80° C. for about 20 min,
    wherein one substrate of the two substrates is a plastic substrate,
    wherein the surfaces of the substrates are not activated or otherwise primed.

14. The method of claim 13, wherein the anaerobically curable composition comprises a benzoyl functionalized compound that is a photoinitiator.

15. An assembly comprising two substrates bonded together by a cure product of an anaerobically curable composition according to Claim 1.

16. A method of adhering two substrates comprising:
    obtaining two substrates, each having surfaces;
    applying to one or both of the substrates an anaerobically curable composition comprising:
        one or more polymerizable (meth) acrylate ester monomers,
        a redox-active metal catalyst,
        saccharin or a saccharin derivative,
        peroxide, and
        a benzoyl functionalized compound,
    wherein the benzoyl functionalized compound and the redox-active metal catalyst are present in the composition in a ratio of at least 3:1;
    combining the two substrates;
    thermally curing the anaerobically curable composition at less than about 80° C. for about 20 min, wherein one substrate of the two substrates is a plastic substrate,
wherein the surfaces of the substrates are not activated or otherwise primed.

17. The method of claim 16, wherein the benzoyl functionalized compound is a photoinitiator.

18. The method of claim 17, wherein the photoinitiator is selected from the group consisting of: 1-hydroxycyclohexyl phenyl ketone; 2-methyl-1-[4-(methylthio) phenyl]-2-morpholino-propan-1-one; 2-benzyl-2-N,N-dimethylamino-1-(4-morpholinophenyl)-1-butanone; a combination of 1-hydroxy cyclohexyl phenyl ketone and benzophenone; 2,2-dimethoxy-2-phenyl acetophenone; a combination of bis (2,6-dimethoxybenzoyl-2,4,4-trimethyl pentyl phosphine oxide and 2-hydroxy-2-methyl-1-phenyl-propan-1-one; 2-hydroxy-2-methyl-1-phenyl-1-propane; a combination of 2,4,6-trimethylbenzoyldiphenyl-phosphine oxide and 2-hydroxy 2-methyl-1-phenyl-propan-1-one;

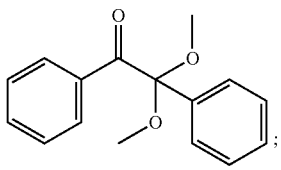
;

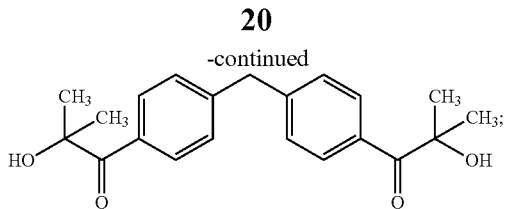

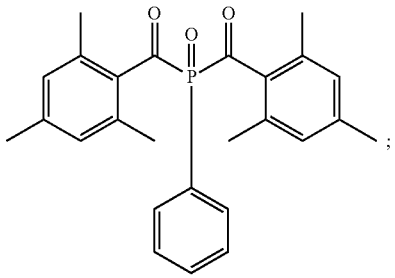
;

and, any combination thereof.

* * * * *